June 30, 1964 R. A. HUNT 3,139,279

RECORD CARD MAGAZINE

Original Filed Nov. 28, 1958 4 Sheets-Sheet 1

INVENTOR.
ROBERT A. HUNT

BY [signature]

ATTORNEY

INVENTOR.
ROBERT A. HUNT
BY [signature]
ATTORNEY

June 30, 1964 R. A. HUNT 3,139,279

RECORD CARD MAGAZINE

Original Filed Nov. 28, 1958 4 Sheets-Sheet 3

INVENTOR.
ROBERT A. HUNT
BY [signature]
ATTORNEY

INVENTOR.
ROBERT A. HUNT

BY [signature]

ATTORNEY

United States Patent Office 3,139,279

Patented June 30, 1964

3,139,279
RECORD CARD MAGAZINE

Robert A. Hunt, Wilbraham, Mass., assignor to Xerox Corporation, New York, N.Y., a corporation of New York Original application Nov. 28, 1958, Ser. No. 776,848. Divided and this application Dec. 14, 1961, Ser. No. 159,373

1 Claim. (Cl. 271—88)

This invention relates to improvements in record card magazines and, particularly, to improvements in magazines of the type which are self-adjusting under the weight of record cards stored in the magazine.

As is well known, in recent years, the steadily increasing size of various industries has required an enormous increase in the number and variety of business records that must be made, maintained, and be kept available for use. Prior to the advent of xerography, previously known conventional systems of record making and keeping were employed for this purpose. However, the increasing enormity of recording operations made this phase of a business increasingly expensive and burdensome to the point that it was becoming economically unfeasible to continue by conventional techniques.

As one facet of the record-keeping problem, the mere protection of the records of a business may be considered. As a safeguard against destruction of records by fire, flood, or other disaster, it became a common practice periodically to microfilm a concern's records and to store these microfilms at locations and under conditions to prevent their inadvertent destruction. Although this technique was effective to preserve the records for possible future reference, it merely added another expense to the record-keeping burden without, in any way, simplifying the handling or maintaining of records. This condition was inherent, first, since the primary purpose was to remove the microfilm records from everyday use and, second, because of the relative inaccessibility of selected records contained on such microfilm.

Recently, there has been developed an improved system for making microfilm records whereby such records may be maintained under conditions of relative security from destruction and, at the same time, be available for day-to-day use. This system is generally known as a "unitized" microfilm system and comprises the basic steps of (1) copying onto microfilm original drawings, tracings, memoranda, reports, or other records likely to require reproduction at a later date, etc.; (2) mounting the individual microfilm frames into the apertures of microfilm data processing cards, which may be designated by coded perforations for use in conventional card-controlled machines; and (3) using such microfilm cards for the reproduction of the film information thereon.

A typical example of a microfilm card of the type contemplated herein is disclosed in Patents 2,511,859, 2,512,106, and 2,587,022. As disclosed in these patents the microfilm card comprises a conventional record card of the type widely used in record-controlled accounting and tabulating systems, but is provided with an aperture with a depressed margin therein in which a microfilm frame may be inserted and permanently secured to the card. When a microfilm frame of data to be reproduced is so mounted in a microfilm card, the card may also be code punched with information defining, identifying, or relating to the microfilm picture. Thereafter, these cards may be manually or machine sorted and otherwise processed in accordance with conventional uses of such cards.

The present invention is an improved record card magazine adapted to be used with card handling systems and specifically disclosed herein as being used in a system which reproduces the microfilm image mounted in the record card.

The principal object of the invention is to improve record card magazines for use in unitized data processing systems. A further object of the invention is to improve the movement of the card support platform in a record card magazine.

These and other objects of the invention are attained by means of a record card magazine with a card stacking platform supported and guided in the center to reduce frictional forces between the guiding members.

A preferred form of the invention is shown in the accompanying drawings in which.

Throughout this description the front of the xerographic processing system (see FIG. 1) is regarded as that portion which the operator faces while placing microfilm cards in the machine for reproduction and while adjusting the several manual operating controls. The right and left ends of the machine are regarded as being to the right and left of the operator as he faces the machine.

Figure 1:
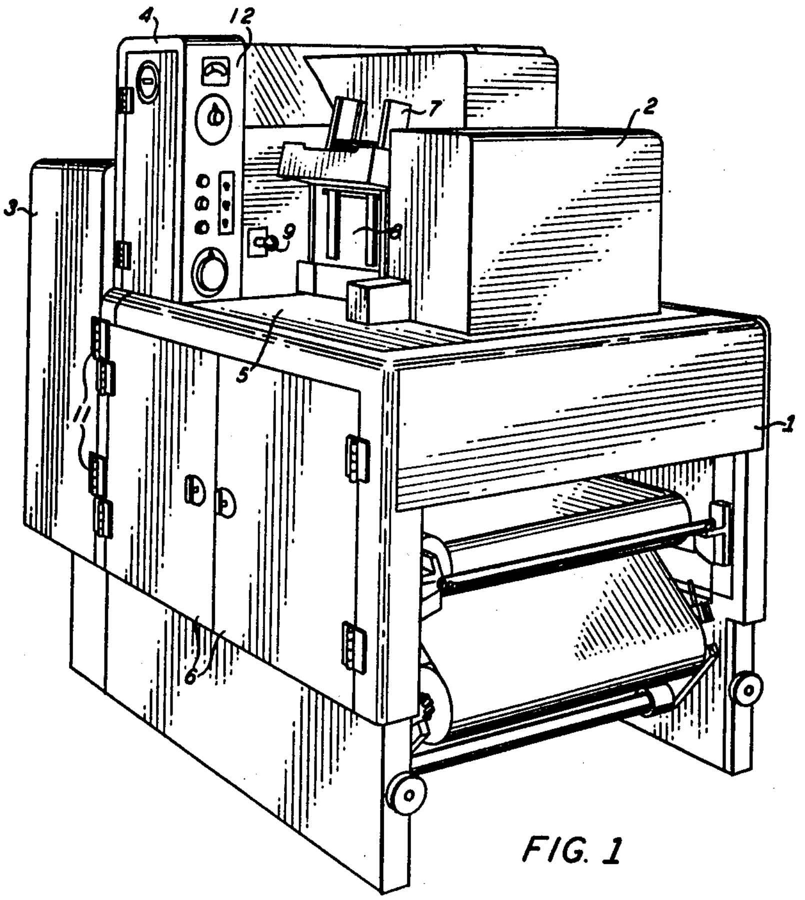
FIG. 1 is a perspective view of an automatic xerographic processing system suitable for use with the invention.

In the particular embodiment shown in the drawings, the invention is used in a microfilm projection system that is a fully automatic, continuous printer for reproducing information contained on microfilm cards. This equipment reproduces copy on a continuous roll of paper, that may have a web width up to 24", from either positive or negative film, in either of two magnification ratios: 15× or 20×; whereby microfilm images of different sizes may conveniently be enlarged to the full width of the web. Referring to FIG. 1, the system may be considered to include four distinct sections for housing the several elements thereof, namely, a base section 1, for housing the xerographic drum, the web tensioning and feeding apparatus, as well as the devices for effecting the xerographic functions of plate charging, image transfer, brush cleaning, etc.; an upper section 2, for housing the card handling apparatus as well as the bulk of the optical system; an end section 3, secured to the left end of the base section, for housing the xerographic developing apparatus; and a control section 4, mounted on the base section and forward of the upper section, for housing certain of the electrical equipment required in the system and to provide a control panel whereon the operator may set selected ones of a plurality of switches for selecting the desired type of operation.

Base section 1 includes two side frames that are connected across their tops by a plate 5, whereby the entire system is supported. Suitable cover plates are included to enclose the mechanism and access doors are provided on the front of the machine to facilitate repair and adjustment. Upper section 2 includes suitable cover plates for enclosing the bulk of the card handling apparatus and the optical system, as well as a card magazine 7 for holding microfilm cards from which reproductions are to be made, and a receiving magazine 8 to which cards are ejected after the microfilm image thereon is reproduced. Also included, is a lever 9 whereby the optical system may be set selectively for 15× or 20× magnification ratio. In addition, a handwheel is provided whereby the position of the card magazine may be altered relative to the optical system, in accordance with the longitudinal dimension of the image on the microfilm card. End section 3 is enclosed by a dust-tight housing and is pivotally mounted on the base section by suitable hinges 11, whereby the entire end section of the machine may be swung outwardly to permit access to the several elements of the developing system, and to permit convenient access to the surface of the xerographic drum for the purpose of cleaning. The entire structure is specifically arranged to form a light-tight enclosure in the areas of the optical projection system and the xerographic developing system.

Control section 4 (see also FIG. 11) includes an instrument panel 12 for supporting the several operating controls in convenient reach of the operator. These controls include a variable transformer control T–4, for varying the intensity of the projection lamp of the optical system; a light intensity meter MET–3, which is employed in testing to determine the light intensity reaching the xerographic drum; and an automatic reset-type counter 4–TR, that is pre-settable to the desired number of copies required to be made of any microfilm card image. In addition, the panel includes a "Run" switch SW–1, to initiate the operation of the system; a "Stop" switch SW–3, that functions to stop the machine within a predetermined interval after it is pushed to permit the completion of certain xerographic operations; and an "Emergency Stop" switch SW–2, that is effective to stop the system instantaneously in the event this should become necessary. Also included are switches for selecting the desired type of operation, as follows: A "Projection Only—Automatic" switch SW–11, whereby the entire machine may be run automatically or the upper section or "head" may be operated independently; a "15×–20×" switch SW–13, for selecting the driving rate of the microfilm card carriage; and a "Card-Roll Film" switch SW–12A, whereby the machine may be set to operate from microfilm cards or from roll film, if desired. It may be noted that an understanding of machine operation with roll film is not essential to the present invention and that, therefore, no portion of the roll film mechanism is described herein.

*General Description of System (FIG. 2)*

Figure 2:
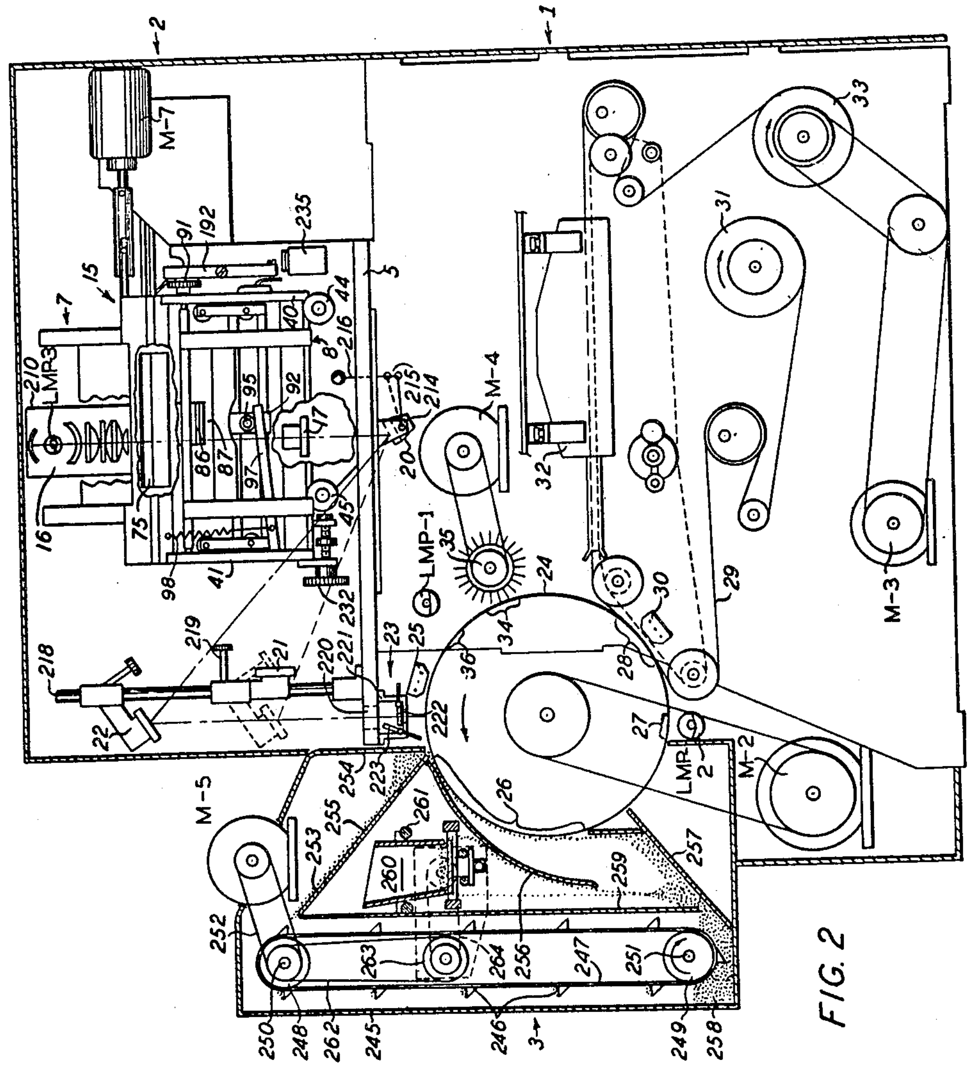
FIG. 2 is a schematic sectional view of the xerographic apparatus and of the invention.

For a general understanding of the xerographic processing system in which the invention is used, reference is had to FIG. 2 in which the various system components are schematically illustrated. As in all xerographic systems based on the concept disclosed in the above-cited Carlson patent, a light image of copy to be reproduced is projected onto the sensitized surface of a xerographic plate to form an electrostatic latent image thereon. Thereafter, the latent image is developed with an oppositely charged developing material to form a xerographic powder image, corresponding to the latent image, on the plate surface. The powder image is then electrostatically transferred to a support surface to which it may be fused by any suitable form of fusing device, whereby the powder image is caused permanently to adhere to the support surface.

In the system disclosed herein, microfilm cards are placed in a card magazine 7 from which they are fed seriatim to a card carriage of a card handling apparatus, generally designated by reference character 15, arranged to the rear of the card magazine assembly. Suitable driving means are provided for the card carriage whereby it is caused to move the card past the optical axis of a projection lens system 16 that is illuminated by a projection lamp LMP–3 for the purpose of scanning the microfilm frame. The microfilm card image is projected downwardly through an adjustable objective lens assembly 17 and then reflected upwardly by an adjustable mirror element 20 to either of two transverse mirror assemblies 21 or 22, in order to vary the length of the optical path, depending on the magnification ratio employed. From mirror assemblies 21 or 22, the light image is projected downwardly through a variable slit aperture assembly 23 and onto the surface of a xerographic plate in the form of a drum 24.

Xerographic drum 24 includes a cylindrical member mounted in suitable bearings in the frame of the machine and is driven in a counterclockwise direction by a motor M–2 at a constant rate that is proportional to the scan rate of the microfilm card, whereby the peripheral rate of the drum surface is identical to the rate of movement of the reflected light image. The drum surface comprises a layer of photoconductive material on a conductive backing that is sensitized prior to exposure by means of a screened corona generating device 25, which may be of the type disclosed in Walkup Patent 2,777,957, that is energized from a suitable high potential source.

The exposure of the drum to the light image discharges the photoconductive layer in the areas struck by light, whereby there remains on the drum a latent electrostatic image in image configuration corresponding to the light image projected from the microfilm card. As the drum surface continues its movement, the electrostatic latent image passes through a developing station 26 in which a two-component developing material, which may be of the type disclosed in Walkup Patent 2,638,416, is cascaded over the drum surface.

After developing, the xerographic powder image passes a discharge station 27 at which the drum surface is illuminated by a lamp LMP–2, whereby residual charges on the non-image areas of the drum surface are completely discharged. Thereafter, the powder image passes through an image transfer station 28 at which the powder image is electrostatically transferred to a support surface web 29 by means of a second corona generating device 30 similar to corona charging device 25, mentioned above.

The support surface to which the powder image is transferred may be of any convenient type and is obtained from a supply roll 31 and is fed over suitable guide and tensioning rolls and directed into surface contact with the drum in the immediate vicinity of transfer corona generating device 30. After transfer, the support surface is separated from the drum surface and guided through a suitable heat fusing apparauts 32, whereby the powder image is permanently affixed to the support surface. Thereafter, the support surface is fed over a further system of guide and tensioning rolls and onto a take-up roll 33 that is driven by motor M–3.

After transfer, the xerographic drum surface passes through a cleaning station 34 at which its surface is brushed by a cleaning brush assembly 35, rotated by a motor M–4, whereby any residual developing material remaining on the drum is removed. Thereafter, the drum surface passes through a second discharge station 36 at which it is illuminated by a fluorescent lamp LMP–1, whereby the drum surface in this region is completely flooded with light to remove any electrostatic charge that may remain thereon. Suitable light traps are provided in the system to prevent any light rays from reaching the drum surface, other than the projected microfilm image, during the period of drum travel immediately prior to sensitization by corona generating device 25 until after the drum surface is completely passed through the developing station 26.

Figure 3:
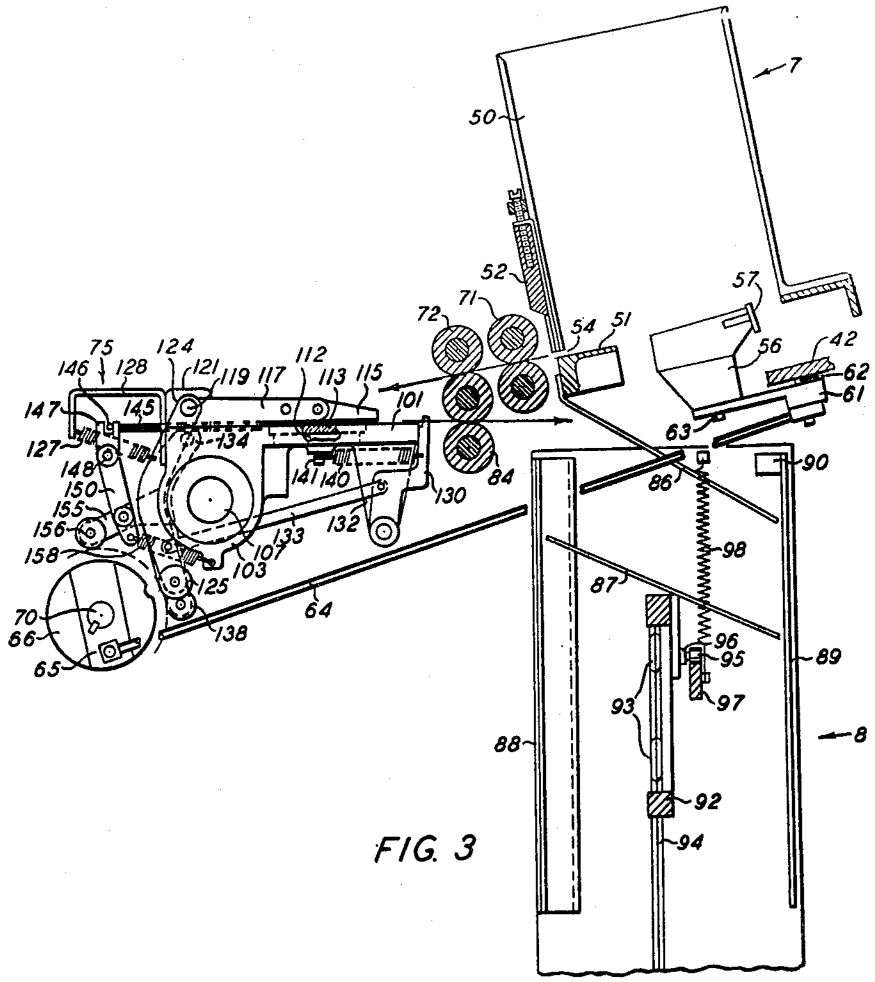
FIG. 3 is a side elevation, partly in section, of the invention.

*Card Feeding Apparatus (FIGS. 3, 4 and 5)*

The card feeding apparatus comprises the several devices that serve to feed microfilm cards seriatim from card magazine 7 (see FIG. 3) to a card carriage whereby they are moved past an optical system that is effective to project the microfilm image onto the xerographic drum one or more times, in accordance with the number of copies required. After projection of the required number of light images, the card is ejected from the card carriage and is deposited in receiving magazine 8.

Figure 4:
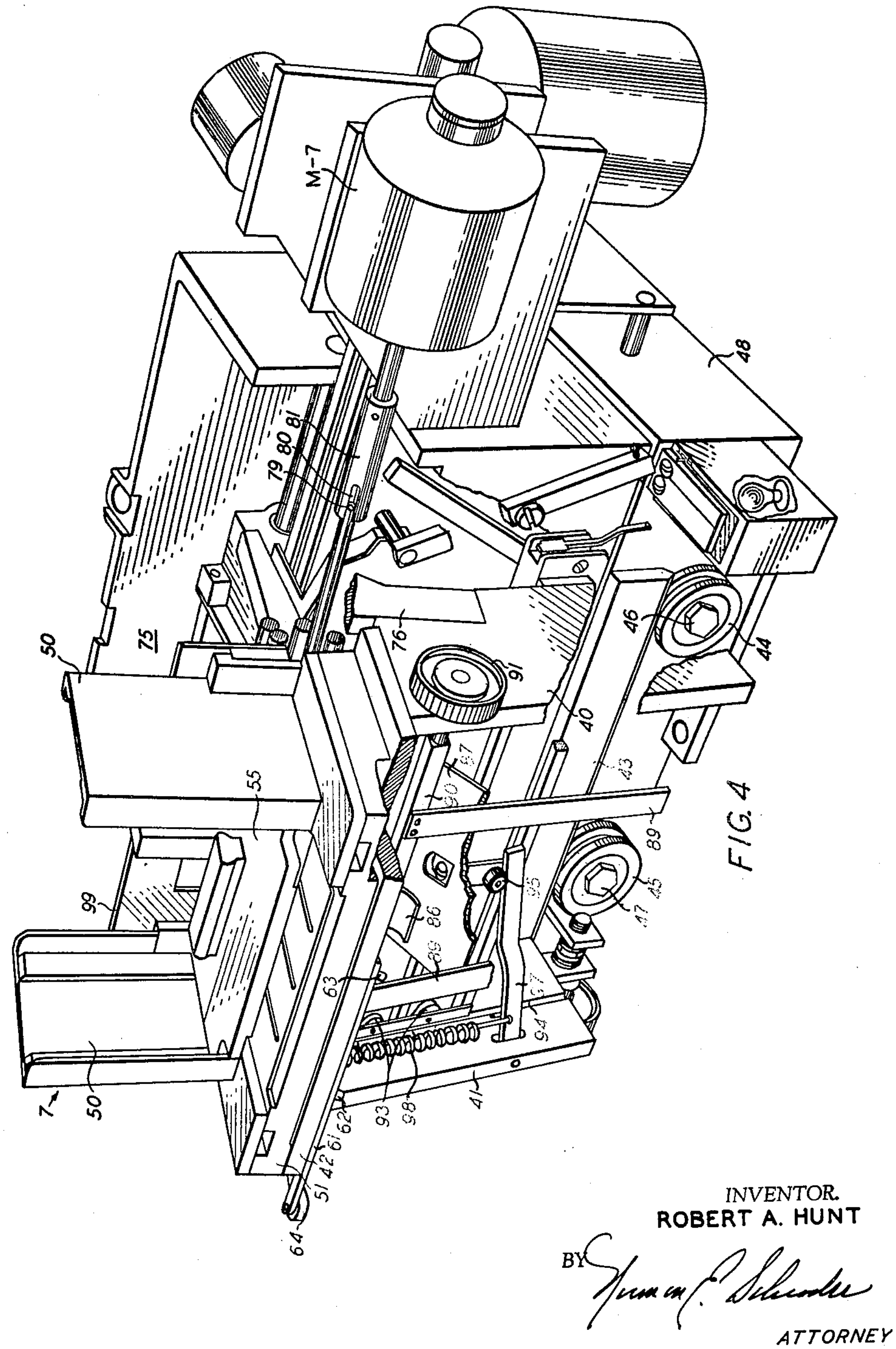
FIG. 4 is a perspective view of the card handling apparatus, as seen from the front of the machine.

For convenience of assembly and adjustment, the card feeding apparatus, as shown in FIG. 4, is mounted on a rigid frame consisting of side plates 40 and 41 and a top plate 42 that is integrally connected with the side plates. Side plates 40 and 41 are also connected at their lower ends by a knife edge member 43 that rides in grooves in rollers 44 and 45 that are rotatably mounted on studs 46 and 47 that are fixed in a base casting 48 that serves to support the entire card handling apparatus and, in turn, is supported on plate 5 of base section 1. By this arrangement the entire weight of the card feeding apparatus is supported by rollers 44 and 45, whereby the entire assembly may be moved laterally, as described below, to adjust the position of the card magazine assembly relative to the card carriage. Suitable guide members (not shown) are provided to maintain the card feeding apparatus in upright position.

Seriatim feeding of the cards is effected by means of an apparatus that is an adaptation of that disclosed in Braun Patent 2,211,094. Microfilm cards are placed in card magazine assembly 7 that includes vertical guide members 50 for holding a stack of cards in alignment, and a base member 51 for supporting the weight of the card stack which, in turn, is supported on frame plate 42. The magazine is arranged to permit the feeding of cards from the bottom of the card stack and an adjustable throat knife assembly 52 is provided at the exit slot 54 of the magazine to retain the remaining cards in the stack as each bottom card is removed. A card weight 55 is provided to hold the cards in proper feeding relation.

For moving each card out of the magazine, the apparatus includes a movable base block 56 that supports the trailing edge of the card stack and is provided with an adjustable pickerknife 57 that is arranged to engage the trailing edge of the lowermost card of the stack. Base block 56 is mounted in suitable ways for sliding movement toward and away from the exit slot of the magazine, and is reciprocated in timed relation to the operation of the remainder of the card handling apparatus. For this purpose, a lever 61 is pivotally mounted on a stud 62 fixed in frame plate 42 and is connected to base block 56 by a shouldered screw 63. The other end of lever 61 is connected to a crank rod 64 which, in turn, is pivotally connected to a crank arm 65 that is adjustably mounted on a detent cam 66 keyed on a cam shaft 70 (see also FIG. 5). As described below, cam shaft 70 is rotated periodically through a single revolution clutch, in timed relation to the remainder of the mechanism, whereby a single card is advanced from card magazine 7, as required.

As each card leaves magazine 7, it is gripped successively by two sets of feed rolls 71 and 72 and advanced rearwardly to a card carriage assembly, generally designated by reference character 75. For this purpose, both sets of feed rolls 71 and 72 are journaled for rotation in supporting brackets 76 and 77 that are secured on side plates 40 and 41, respectively, and the upper rolls are resiliently urged into engagement with the lower rolls by springs 78. For driving the feed rolls, the shaft of lower roll 71 extends through bracket 76 and is provided with a pin 79 that engages a slot 80 in a collar 81 fixed on the drive shaft of a motor M–7 that rotates continuously while the apparatus is in operation. The remaining rolls are positively driven through pinions 82 fixed on each feed roll shaft and an idler pinion 83 mounted on bracket 77, whereby the two upper rolls 71 and 72 are rotated clockwise, as viewed in FIGS. 3 and 5, and lower rolls 71 and 72 are rotated counterclockwise to advance the card to card carriage assembly 75, which at this point of operation is directly aligned with the feed rolls to receive the card.

Immediately thereafter, the card carriage is moved to the right, in a path of movement normal to the card feeding movement, to effect the image scanning operation. After the microfilm image in the card is scanned by the optical system, carriage assembly 75 is returned to a position in alignment with the feed rolls and the card is ejected from the carriage assembly, as described below. Thereupon it is engaged by lower feed roll 72 that is in frictional contact with an idler feed roll 84 that is rotatably mounted in arms 85, that are pivoted on side plates 40 and 41, and is resiliently urged into contact with feed roll 72. The continued driving action of feed roll 72 is thereby effective to move the card forwardly against a deflector plate 86 that causes the card to drop downwardly and come to rest on a support plate 87 in receiving magazine 8.

The receiving magazine includes suitable vertical guide members 88 to confine the movement of the cards rearwardly, and gate members 89 are fixed on a rod 90 that is rotatably mounted in side plates 40 and 41. Gate members 89 are effective to maintain the cards in a vertical stack but may conveniently be swung outwardly by rotating a knob 91 fixed on rod 90, whereby the operator may remove cards from the machine. Support plate 87 of the magazine is secured on a rectangular frame assembly 92 having rollers 93 that ride in vertical grooves 94 in side plates 40 and 41, whereby support plate 87 is guided for vertical movement. A roller 95 is mounted on a stud 96 fixed in frame assembly 92 and rides on a lever 97 that is pivotally mounted in side plate 41. Spring 98 is extended between lever 97 and the magazine frame to urge frame assembly 92 and support plate 87 upwardly, when there are no cards in the magazine. This construction minimizes the possibility of cards tumbling as they are ejected from the card carriage and, at the same time, provides a support plate structure that moves downwardly as additional cards are added, against the tension of spring 98, whereby a substantial number of cards may be stacked in the receiving magazine before it is necessary for the operator to remove them.

In the event of a misfeed of a card or in the event the supply of cards in card magazine 7 becomes exhausted, means are provided to stop the machine to enable the operator to make the necessary adjustments. For this purpose, a "card detector switch" 6–LS (see FIG. 5) is mounted on the back plate 99 of card magazine 7. This switch functions in conjunction with the remainder of the electrical circuit to keep the several operating circuits energized as long as switch 6–LS is actuated during the period in which a card is supposed to be passed through feed rolls 71 and 72. For this purpose, a switch-actuating element 100 extends downwardly between the upper feed rolls 71 and 72 and into the path of movement of the cards. Engagement of each card with actuating element 100 serves to maintain the desired circuitry energized. In the event there is a failure to feed a card, switch 6–LS is not actuated and the circuit is thereby broken to stop the machine, as described below.

This application is a division of application Serial No. 776,848, filed November 28, 1958, in the name of Robert A. Hunt. For a more detailed description of the operation of the xerographic system and the record card handling apparatus, which is not essential to the operation of this invention, reference is had to the above-referenced application.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

A record card receiving magazine including a pair of side plates with a vertical groove substantially in the center of each plate;

a card receiving platform positioned between the side plates with its center substantially aligned with the vertical grooves;

a frame member attached to the card receiving platform substantially in the center thereof;

a pair of vertically aligned guide rollers rotatably mounted on each side of the frame member and cooperating with the vertical grooves in the side plates;

the axis of rotation of said rollers being parallel to the side plates, whereby the card receiving platform and the frame member are freely movable in a vertical direction within the side plates;

the construction and arrangement of the side plates, the card receiving platform, the frame member, and the guide rollers being such that the center of the platform is substantially in line with the vertical grooves and rollers;

a lever pivotally mounted on one of the side plates and extending beneath the card receiving platform;

a spring positioned to urge the lever in an upward direction;

and a support roller mounted at the center of the frame member and having its axis of rotation normal to the plane of the frame member, the support roller being arranged to ride on the lever, whereby the spring and the lever cooperate to support the frame member at its center throughout the movement of the card receiving platform.

References Cited in the file of this patent

UNITED STATES PATENTS

| | | |
|---|---|---|
| 818,924 | Strong | Apr. 24, 1906 |
| 1,135,802 | Hotaling | Apr. 13, 1915 |
| 2,181,995 | Keil | Dec. 5, 1939 |
| 2,771,293 | Guthridge | Nov. 20, 1956 |
| 2,788,131 | Bergstrom et al. | Apr. 9, 1957 |